United States Patent [19]

Aidlin et al.

[11] Patent Number: 4,822,214

[45] Date of Patent: Apr. 18, 1989

[54] AIR CONVEYOR

[75] Inventors: Samuel S. Aidlin; Stephen H. Aidlin; Larry Kincaid, all of Sarasota, Fla.

[73] Assignee: Aidlin Automation Corp., Bradenton, Fla.

[21] Appl. No.: 62,171

[22] Filed: Jun. 12, 1987

[51] Int. Cl.$^4$ .............................................. B65G 51/00
[52] U.S. Cl. ...................................... 406/86; 406/88
[58] Field of Search ................... 406/86, 87, 88, 89, 406/90; 221/162; 198/389, 455, 493, 786; 156/500

[56] References Cited

U.S. PATENT DOCUMENTS

| | | | |
|---|---|---|---|
| 3,181,916 | 5/1965 | Epstein | 406/88 |
| 3,350,140 | 10/1967 | Strydom | 406/88 |
| 3,850,478 | 11/1974 | Hurd | 406/88 |
| 3,873,163 | 3/1975 | Gladish | 406/88 |
| 4,132,584 | 1/1979 | Aidlin et al. | 156/500 |
| 4,284,370 | 8/1981 | Danler et al. | 406/86 |
| 4,721,419 | 1/1988 | Lenhart | 406/88 |

Primary Examiner—Sherman D. Basinger
Assistant Examiner—Stephen P. Avila
Attorney, Agent, or Firm—Dominik, Stein, Saccocio, Reese, Colitz & Van Der Wall

[57] ABSTRACT

A machine for manufacturing bottles including pneumatic conveying apparatus for container bodies and pneumatic conveying apparatus for base cups and a base cupping assembly and for joining the conveyed container bodies and base cups to form bottles. The conveying apparatus for the container bodies has an interior channel member with louvers in the top and side walls and an exterior channel member thereover to form a plenum chamber therebetween for functioning with the interior channel member and its louvers in effecting the conveying of container bodies.

12 Claims, 3 Drawing Sheets

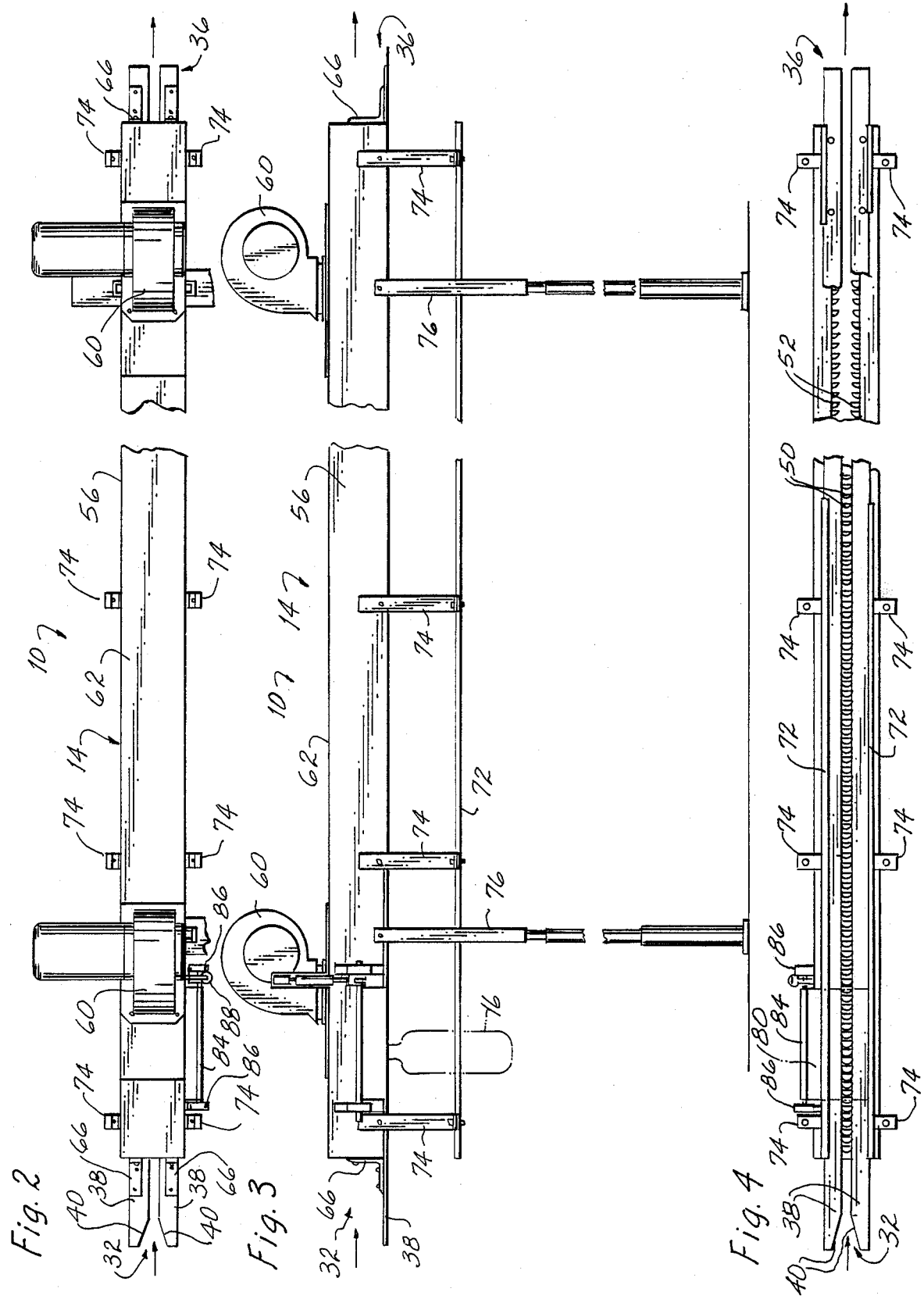

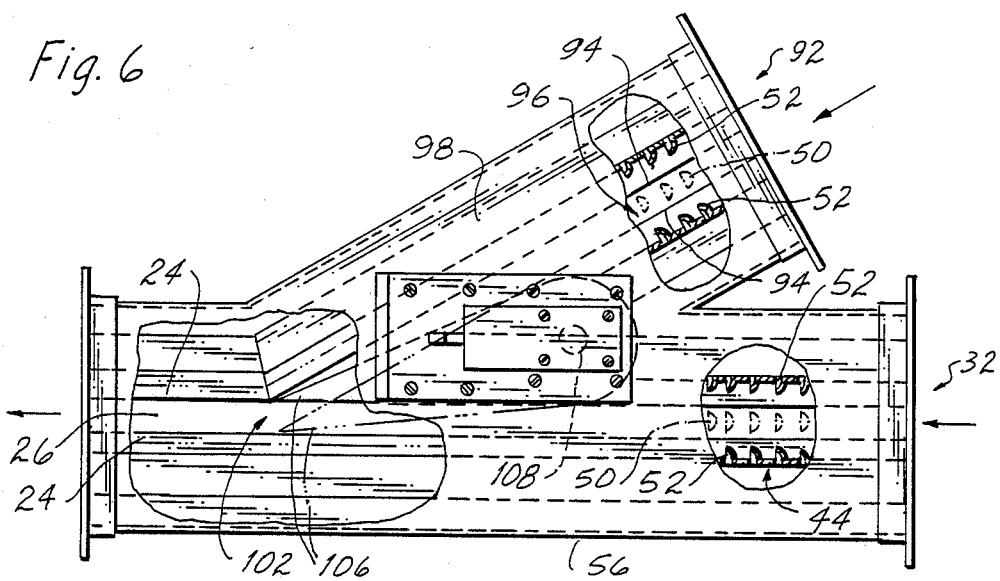
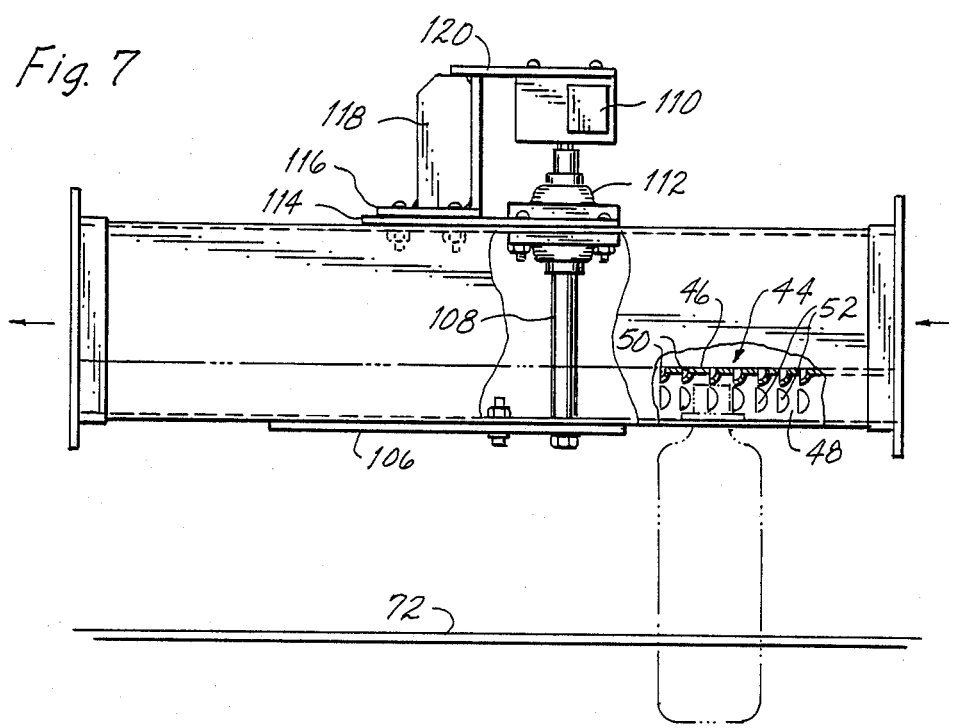

AIR CONVEYOR

BACKGROUND OF THE INVENTION

1. Field of the Invention

This invention relates to manufacturing bottles and, more particularly, to an improved bottle manufacturing machine with pneumatic conveying apparatus for container bodies and pneumatic conveying apparatus for base cups and a base cupping assembly and for joining the conveyed container bodies and base cups to form bottles.

2. Description of the Background Art

Many types of plastic bottles manufactured from thermoplastic synthetic resins are in wide use throughout the carbonated beverage and other industries because of the economical cost of manufacture of the same. Plastic bottles of this character are usually formed from injection molded parisons having a threaded neck portion and a long slender body portion. The injection molded parison is blow-molded to its intended size by positioning the parison in a blow-molding unit, applying heat to the body portion of the parison, and then injecting air into the parison to blow-mold the same to the desired shape.

Experience has shown that blow-molding flat bottomed plastic bottles are not satisfactory in terms of stability against deformation during use. Hence, virtually all blow-molded parisons include rounded bottoms to which is glued a previously injection molded base cup. The base cup provides great durability against deformation.

A state-of-the-art base cupping machine for assembling base cups to round-bottomed plastic bottles is disclosed in U.S. Pat. No. 4,132,584 to Aidlin. Basically, this machine comprises a multilevel turntable having equispaced pockets about its periphery. During use, blow-molded plastic bodies are deposited into the recesses of the upper levels by means of a conveyor system interposed between the blow-molding machine and the turntable. Further downline of the periphery of the turntable, a supply of base cups is deposited into the recesses of the lower most level. Then, during operation, the container bodies inserted within the upper levels of the turntable are forced downwardly by pneumatic cylinders into engagement with the respective base cups below. The container bodies are then rigidly secured within the base cups by means of an adhesive sprayed into the base cup prior to being deposited within the recesses of the turntable. The assembled plastic bottles are then ejected from the turntable for subsequent cleaning and filling with the desired beverage or the like.

The machine described above has been widely accepted throughout the industry. Unfortunately, a significant problem associated with that type of machine is the feeding of the base cups therein with the adhesive already sprayed into the inside bottom of the base cups. Specifically, as disclosed in said patent, the adhesive is applied to the base cups by means of an adhesive spray nozzle positioned above the path of base cups moving below on a flat conveyor. Since experience has shown that spraying the adhesive into a base cup is feasibly only when the base cup is stationary, it therefore becomes necessary to constantly stop the movement of the conveyor belt such that the base cup remains stationary underneath the adhesive spray nozzle for a short, but finite, period of time.

The necessity to stop the flow of the base cups also requires that the movement of the turntable be continually interrupted to coincide with the interrupted flow of base cups into the turntable's recesses. Consequently, the continual interrupted movement of the turntable significantly reduces the speed in throughput of the machine. Furthermore, the interrupted movement of the turntable significantly increases the wear on the component parts thereof, thereby decreasing the operational life of the machine.

The features of a bottle manufacturing machine without the continual interrupted movement of the prior art are disclosed in U.S. patent application Ser. No. 07/062,157, entitled Interrupted Screw Feed for Base Cupping Machine, executed and filed concurrently herewith in the name of Aidlin et al and assigned to the assignee of the instant application.

Another problem associated with the known machines for manufacturing bottles is in the apparatus for conveying the container bodies and base cups. For example, the above-mentioned patent to Aidlin feeds both the container bodies and base cups to the base cupping assembly by mechanical conveyors. Such conveyors have performed their functions adequately in the past. More recently, however, container bodies have been fed pneumatically by flows of air which effect the intended conveying more efficiently than mechanical conveyors. A typical pneumatic conveyor for use in association with a base cupping assembly is described in U.S. Pat. No. 4,284,370 to Danler. However, pneumatic conveyors in use today, including those of the type disclosed in the above-described Danler patent, are excessively large and costly and do not employ the conveying air in an efficient manner. As a result, the operation and use of such known pneumatic conveyors is inefficient, loud and costly to both manufacture and operate. Further, the conveying often imparts a rocking motion to the conveyed articles resulting in jams and down time of the equipment.

As illustrated by the large number of prior patents and known conveying techniques, efforts are continuously being made in an attempt to convey articles such as container bodies and base cups more efficiently, conveniently, reliably and economically. None of these previous efforts, however, provides the benefits attendant with the present invention. Additionally, prior techniques do not suggest the present inventive combination of component elements as disclosed and claimed herein. The present invention achieves its intended purposes, objectives and advantages over the prior art devices through a new, useful and unobvious combination of component elements which is simple to use, with the utilization of a minimum number of functioning parts, at a reasonable cost to manufacture and use and by employing only readily available components.

Therefore, it is an object of this invention to provide an improved bottle manufacturing machine with pneumatic conveying apparatus for container bodies and pneumatic conveying apparatus for base cups and a base cupping assembly and for joining the conveyed container bodies and base cups to form bottles.

It is a further object of the invention to provide an improved pneumatic conveying apparatus for container bodies. The apparatus comprising a pair of laterally spaced neck tracks defining an elongated slot therebetween for slidingly supporting a container body by its neck. The apparatus also comprises an inverted, U-shaped, interior channel member extending upwardly from the neck tracks spanning the slot and extending longitudinally substantially the length of the slot and having a cross sectional area sufficient to receive the portion of a container body above its neck, the interior channel member having a top wall and side walls with air directing louvers formed in the top wall and side walls. The apparatus also comprises an inverted, U-shaped, exterior channel member extending upwardly from the neck tracks enclosing the interior channel member and extending longitudinally substantially the length of the slot, the cross sectional area of the exterior channel member being between about five and fifteen times larger than the cross sectional area of the interior channel member. The apparatus also comprises pneumatic means to introduce air under pressure to the space between the exterior and interior channel members whereby such space may constitute a plenum chamber and direct a flow of air within the interior chamber in a direction dictated by the angle of the louvers for conveying container bodies supported by their necks on the neck tracks in the direction of the air flow.

It is yet a further object of the invention to pneumatically convey container bodies with interior and exterior channel members with a plenum chamber between the members and with louvers in the top and side walls of the interior chamber.

Lastly, it is an object of the invention to reduce the size, cost and noise of pneumatic conveyors while increasing their efficiency.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjuction with the accompanying drawings.

SUMMARY OF THE INVENTION

The invention is defined by the appended claims with a specific embodiment shown in the attached drawings. For the purpose of summarizing the invention, the invention comprises pneumatic conveying apparatus for container bodies. The apparatus comprising a pair of laterally spaced neck tracks defining an elongated slot therebetween for slidingly supporting a container body by its neck. The apparatus also comprises an inverted, U-shaped, interior channel member extending upwardly from the neck tracks spanning the slot and extending longitudinally substantially the length of the slot and having a cross sectional area sufficient to receive the portion of a container body above its neck, the interior channel member having a top wall and side walls with air directing louvers formed in the top wall and side walls. The apparatus also comprises an inverted, U-shaped, exterior channel member extending upwardly from the neck tracks enclosing the interior channel member and extending longitudinally substantially the length of the slot, the cross sectional area of the exterior channel member being between about five and fifteen times larger than the cross sectional area of the interior channel member. The apparatus also comprises pneumatic means to introduce air under pressure to the space between the exterior and interior channel members whereby such space may constitute a plenum chamber and direct a flow of air within the interior chamber in a direction dictated by the angle of the louvers for conveying container bodies supported by their necks on the neck tracks in the direction of the air flow.

The cross sectional area of the exterior channel member is about ten times larger, plus or minus ten percent, than the cross sectional area of the interior channel member. The apparatus further includes end plates secured to the ends of the exterior channel members with cut out areas to allow for the passage of portions of container bodies through the interior channel member. The apparatus further includes guides in the form of rods suspended from the neck tracks on opposite sides of the slot along the length of the slot to preclude the lateral movement of container bodies being conveyed. The apparatus further includes a gate track formed along a portion of the length of one of the neck tracks and means to move the gate track between a first position wherein the gate track functions as an extension of the neck track in the guiding and conveying of container bodies and a second position wherein the gate track is disposed remote from the neck track for allowing the conveyed container bodies to fall from the conveying apparatus as when a stoppage of container bodies occurs. The apparatus has an input end for the receipt of container bodies to be conveyed and an output end in operative association with a base cupping assembly whereat the conveyed container bodies may be coupled with base cups. The apparatus further includes a supplemental input end with supplemental neck tracks, interior channel member, exterior channel member and pneumatic means, all operatively coupled to the first mentioned neck tracks, interior channel member, exterior channel member and pneumatic means at a point between the first mentioned input end and the output end whereby container bodies may be conveyed to the output end from either of the two input ends and further including a cam movable between first and second positions whereby container bodies may be conveyed to the output end from one input end to the preclusion of the other input end. The apparatus further includes a second conveying apparatus with an input end and with an output end positioned in operative association with the base cupping assembly for pneumatically conveying base cups to the base coupling assembly for being coupled to conveyed container bodies. The second conveying apparatus includes an elongated plenum chamber extending substantially from its input end to its output end and with the upper surface of the plenum chamber being formed with air-directing louvers and constituting the surface over which the base cups are conveyed by a flow of air from the plenum chamber, through the louvers, in contact with the base cups being conveyed. The second conveying apparatus further includes pneumatic means to introduce air under pressure to the plenum chamber. The second conveying apparatus further includes rails supported above the plenum chamber to contact the sides and top of the conveyed base cups to guide the conveyed base cups along their path of movement.

In addition, the invention may also comprise a machine for manufacturing bottles by coupling container bodies and base cups. The machine comprises a base cupping assembly for receiving conveyed container bodies and conveyed base cups and for coupling the received container bodies and received base cups. The machine also comprises a first pneumatic conveying apparatus for container bodies with an input end and with an output end positioned in operative association with the base cupping assembly for pneumatically conveying container bodies to the base coupling assembly for being coupled with conveyed base cups. The first pneumatic conveying apparatus has a pair of laterally spaced neck tracks defining an elongated slot therebetween for slidingly supporting a container body by its neck. The first pneumatic conveying apparatus also has an inverted, U-shaped, interior channel member extending upwardly from the neck tracks spanning the slot and extending longitudinally substantially the length of the slot and having a cross sectional area sufficient to receive the portion of a container body above its neck, the interior channel member having a top wall and side walls with air-directing louvers formed in the top wall and side walls. The first pneumatic conveying apparatus also has an inverted, U-shaped, exterior channel member extending upwardly from the neck tracks enclosing the interior channel member and extending longitudinally substantially the length of the slot, the cross sectional area of the exterior channel member being between about five and fifteen times the cross sectional area of the interior channel member. The first pneumatic conveying apparatus also has pneumatic means to introduce air under pressure to the space between the exterior and interior channel members whereby such space may constitute a plenum chamber and direct a flow of air within the interior chamber in a direction dictated by the angle of the louvers for conveying container bodies supported by their necks on the neck tracks in the direction of the air flow. The machine also comprises a second pneumatic conveying apparatus with an input end and with an output end positioned in operative association with the base cupping assembly for pneumatically conveying base cups to the base coupling assembly for being coupled to conveyed container bodies. The second pneumatic conveying apparatus also has an elongated plenum chamber extending substantially from its input end to its output end and with the upper surface of the of the plenum chamber being formed with air-directing louvers and constituting the surface over which the base cups are conveyed by a flow of air from the plenum chamber, through the louvers in contact with the base cups being conveyed. The second pneumatic conveying apparatus also has pneumatic means to introduce air under pressure to the plenum chamber.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 2 is a plan view of the conveying apparatus for the container bodies as shown in FIG. 1;

FIG. 3 is an elevational view of the conveying apparatus for the container bodies as shown in FIGS. 1 and 2;

FIG. 4 is a bottom view of the conveying apparatus for the container bodies as shown in FIGS. 1, 2 and 3;

FIG. 6 is a plan view of a container bottle diverter mechanism adapted for use in the container body conveying apparatus;

FIG. 7 is an elevational view of the diverter mechanism as shown in FIG. 6; and

Similar reference characters refer to similar parts throughout the several the drawings.

DETAILED DESCRIPTION OF THE PREFERRED EMBODIMENT

Figure 1:
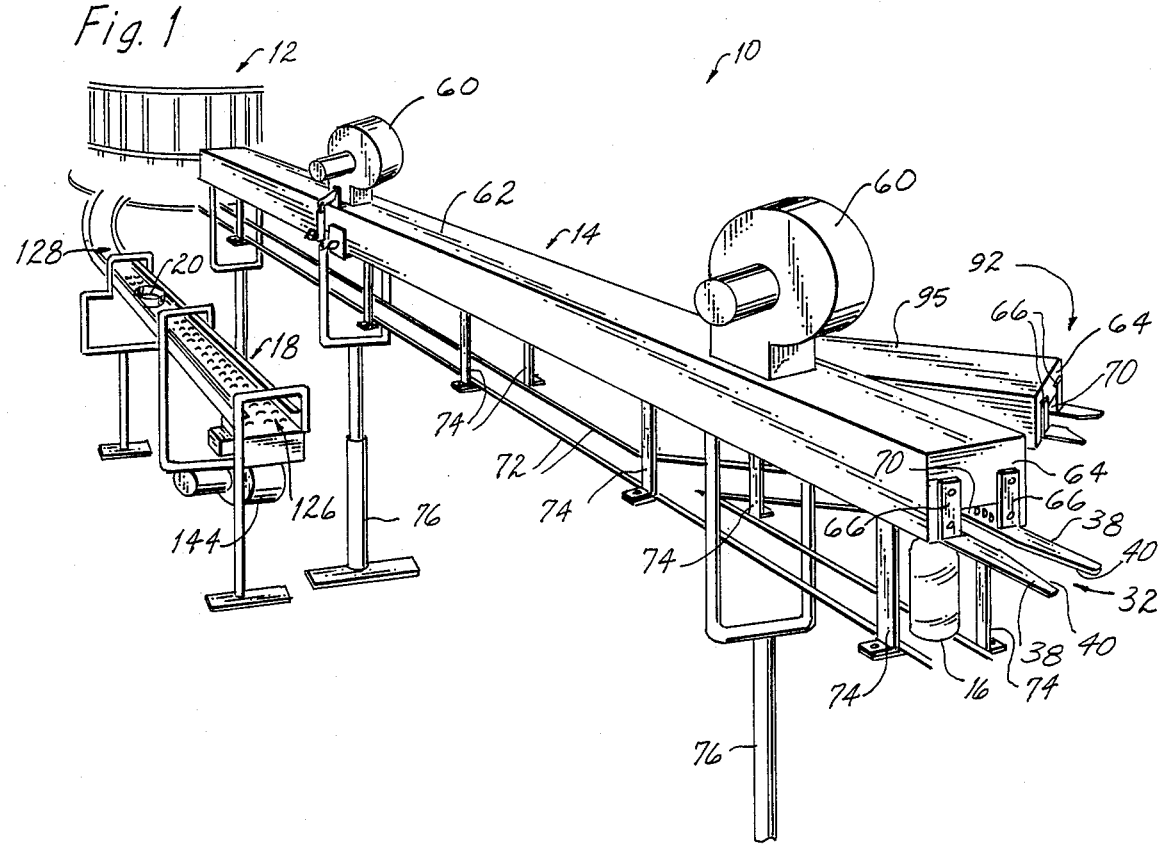
FIG. 1 is a perspective view of part of the bottle manufacturing machine with the conveying apparatus constructed in accordance with the principles of the present invention.

As illustrated in FIG. 1, the machine 10 for manufacturing molded soft-drink bottles comprises a cupping assembly 12 and conveyors, a first conveyor 14 for transporting thermoplastic container bodies 16 from a blow-molding machine, not shown, to a turntable of the base cupping assembly 12 and a second conveyor 18 for transporting formed base cups 20 from an injection-molding machine, not shown, to the turntable of the same base cupping assembly 12. The turntable includes stacked circular disks mounted for rotation about a vertical axis on a shaft which is journaled in a frame and driven by an appropriate motor. Further details of the base cupping assembly 12 may be had by reference to the above-discussed U.S. Patent to Aidlin and patent application to Aidlin et al., the disclosures of which are hereby incorporated by reference herein.

The thin-walled round-bottomed container bodies 16 as well as their base cups 20 are shaped in the well-known manner in chambers of the molding units suspended above the frame. The container bodies 16 and base cups 20 produced in each molding cycle are fed onto the first and second conveyors 14 and 18 at locations remote from the base cupping assembly 12. These container bodies are then transported to the base cupping assembly 12 for being coupled together as by glue. Flat-bottomed base cups 20, with concaved upper contact surfaces complimentary to the rounded undersides of container bodies, are conveyed from a non-illustrated supply, an injection-molding machine, which are synchronized with blow-molding machine.

The container bodies may be blow-molded from polyethylene terephthalate (PET), for example, which is impervious to gases and can therefore be used with carbonated beverages. The base cups, on the other hand may consist simply of polyethylene, or the like.

The first pneumatic conveying apparatus or conveyor 14 is that for the container bodies. The first components of the conveyor are a pair of parallel, laterally spaced neck tracks. The space between the neck tracks 24 defines an elongated slot 26 for supporting and sliding a container body by its neck 28, a slightly enlarged portion of the container body at its upper end, along its path of movement from the input end 32 to the output end 36. A neck track extension 38 with tapered interior edges 40 is positioned at the input end 32 of the conveyor to assist in positioning container bodies onto the neck tracks.

Figure 5:
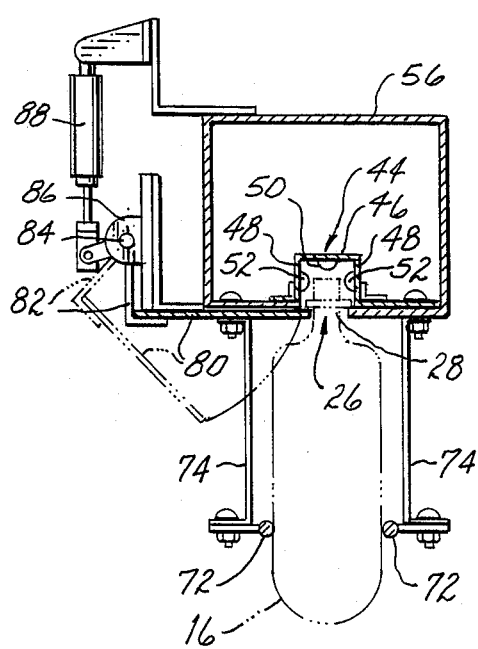
FIG. 5 is an end view of the conveying apparatus for the container bodies as shown in FIG. 1 through 4 with parts broken away to show certain internal constructions and showing a container body to be conveyed.
Figure 8:
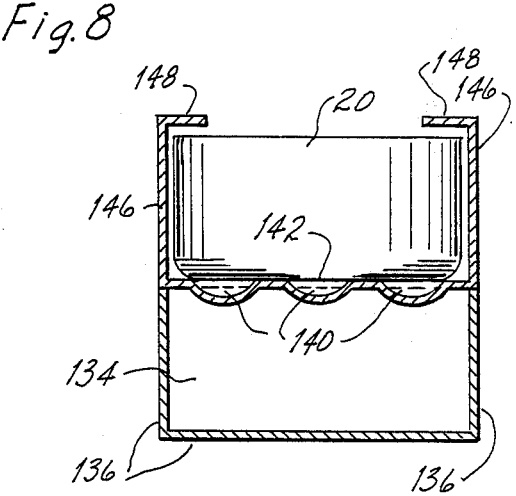
FIG. 8 is an enlarged perspective view of the base cup conveying apparatus as shown in FIG. 1.

Mounted to the neck tracks is an inverted, U-shaped, interior channel member 44. This member projects upwardly from the neck tracks and spans the slot 26. It extending longitudinally for substantially the length of the slot and has a cross sectional area sufficient to receive the portion of a container body above its neck. Note FIG. 5. The interior channel member has a horizontal top wall 46 and vertical side walls 48 secured to the neck tracks as by appropriate brackets. In addition, the top wall and side walls are all formed with air-directing louvers 50 and 52 for effecting the movement of container bodies as will be explained hereinafter.

An inverted, U-shaped, exterior channel member 56 is also mounted on the upper surface of the neck tracks. The exterior channel member, like the interior channel member, projects upwardly from the neck tracks and symmetrically encloses the interior channel member 44. The exterior channel member 56 extends longitudinally substantially the length of the slot. The cross sectional area of the exterior channel member is between about five and fifteen times larger than the cross sectional area of the interior channel member. Preferably, the cross sectional area of the exterior channel member is about ten times larger, plus or minus ten percent, than the cross sectional area of the interior channel member.

In operation and use, a plurality of pneumatic fans 60 are positioned along the length of the upper face 62 of the exterior channel member 56 in fluid communication with the space therebeneath. Activation of the fans will introduce air under pressure to the space between the exterior and interior channel members whereby such space may constitute a plenum chamber which functions to direct a flow of air within the interior chamber in a direction dictated by the angle of the louvers. The flow of air will act to contact and convey container bodies supported by their necks on the neck tracks in the direction of the air flow.

Prior pneumatic conveyors, as for example those of the type described in the above-discussed patent to Danler, employ louvers only on the side walls of the interior channel. It has been found, however, that the addition of louvers to the top wall acts to retain the container bodies vertically during conveying for greater efficiency and smoothness of conveying with a reduction of stoppage due to misfeeding. It is thought that such additional louvers on the top wall of the interior channel do not merely increase the flow of conveying air but that such louvers tend to fill the container bodies with air, holding them down, and making them easier to convey while minimizing their swinging in the plane of their direction of movement. Further, the arrangement of components of the conveying assembly of the present invention allows for the reduction in the size of the exterior channel member with reduced size, cost and noise along with improved performance.

The efficiency of the pneumatic arrangement is enhanced by end plates 64 secured to the ends of the exterior channel members. Brackets 66 couple the end plates to the neck tracks. Cut out areas 70 are formed in the end plates to allow for the passage of the upper portions of conveyed container bodies onto, and from, the neck tracks of the conveying apparatus and through the interior channel member. Further, guides in the form of rods 72 are suspended by spaced guide mounts 74 from the exterior channel member and neck tracks. They are located on opposite sides of the slot along the length of the slot act to preclude the lateral movement of container bodies being conveyed. Parallel with the guide mounts, at spaced locations along the conveying apparatus, are telescoping support legs 76 for adjustably positioning the conveying apparatus with respect to the base cupping assembly and source of supply of container bodies.

Shown in FIGS. 2, 3 and 4 is a gate track 80 formed along a portion of the length of one of the neck tracks. The gate track is a horizontal plate which, during conveying, functions as a part of the neck track in the guiding and conveying of container bodies. A vertically extending plate 82 extends upwardly from the exterior edge of the gate track whereat its upper end is coupled for movement with a rotatable rod 84. The ends of the rod 84 are journaled for rotation in pillow blocks 86. An air cylinder 88 is coupled to the rod to move the gate track between a first position wherein the gate track functions to assist in the guiding and conveying of container bodies and a second position wherein the gate track is located remote from the neck track. This second position allows the conveyed container bodies to fall from the conveying apparatus as might be desired when a stoppage of container bodies occurs.

As discussed above, the conveying apparatus has an input end for the receipt of container bodies to be conveyed and an output end in operative association with a base cupping assembly. In certain situations it is desired to have a supplemental input end 92 with supplemental neck tracks 94, interior channel member 96, exterior channel member 94 and pneumatic means. Note FIGS. 6 and 7. These supplemental components are all operatively coupled to the neck tracks, interior channel member, exterior channel member and pneumatic means of the primary path as shown in FIGS. 2, 3 and 4. They operatively couple at a point 102 between the first mentioned input end 32 and the output end 36 whereby container bodies may be conveyed to the output end from either of the two input ends.

Selective utilization of the two input ends is effected by a diverter member or cam 106. The cam is movable between first and second positions whereby container bodies may be conveyed to the output end 36 from one input end 32 or 92 to the preclusion of the other input end 92 or 32. Preclusion from feeding occurs when the end of the cam remote from its axis of rotation is rotated into interference relationship with the path of movement of container bodies from one or the other input ends. The cam is mounted for reciprocation in a horizontal plane beneath the neck tracks between its two positions by virtue of its mounting on a rotatable vertical shaft 108, the upper end of which is the output of the rotary actuator 110. A central portion of the shaft is journaled in a fixed bearing 112. The bearing and rotary actuator are fixedly coupled through a series of coupled plates 114, 116, 118 and 120. It should also be appreciated that this section of the conveyor could be reversed whereby one input end could selectively feed to two output ends as, for example, where one source of container bottles were feeding two cupping assemblies.

The bottle manufacturing machine 10 also includes a second pneumatic conveying apparatus or conveyor 18. The second conveyor is for the base cups. Like the first conveyor, the second conveyor has an input end 126 and an output end 128 positioned in operative association with the base cupping assembly 12 for pneumatically conveying base cups 20 to the base coupling assembly 12 for being coupled to conveyed container bodies 16. The second conveying apparatus 18 includes an elongated plenum chamber 134 formed of a member 136 with a rectangular cross section extending substantially from its input end to its output end. The upper surface of the plenum chamber is formed with air-directing louvers 140 and constitutes the surface 142 over which the base cups 20 are conveyed by a flow of air from the plenum chamber. From the plenum chamber, the air flows through the louvers into contact with the base cups for effecting their conveyance. Pneumatic fans 144 are located at spaced locations along the plenum chamber to provide air under pressure to the plenum chamber and to the base cups. Above the plenum chamber are guide rails 146 and 148 to contact the sides and top of the conveyed base cups to guide them along their path of movement.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and combination and arrangement of parts may be resorted to without departing from the spirit of the invention. Now that the invention has been described,

What is claimed is:

1. A pneumatic conveying apparatus for container bodies comprising:
   a pair of laterally spaced neck tracks defining an elongated slot therebetween for slidingly supporting a container body by its neck;
   an inverted, U-shaped, interior channel member extending upwardly from the neck tracks spanning the slot and extending longitudinally substantially the length of the slot and having a cross sectional area sufficient to receive the portion of a container body above its neck, the interior channel member having a top wall and side walls with air directing louvers formed in the top wall and side walls, the louvers of the top wall being shaped to direct a flow of air into a container body located in operative proximity therewith to thereby provide a driving force within the container body in addition to the driving force outside the container body created by the side louvers;
   an inverted, U-shaped, exterior channel member extending upwardly from the neck tracks enclosing the interior channel member and extending longitudinally substantially the length of the slot, the cross sectional area of the exterior channel member being between about five and fifteen times larger than the cross sectional area of the interior channel member; and
   pneumatic means to introduce air under pressure to the space between the exterior and interior channel members whereby such space may constitute a plenum chamber and direct a flow of air within the interior chamber in a direction dictated by the angle of the louvers for conveying container bodies supported by their necks on the neck tracks in the direction of the air flow.

2. The conveying apparatus as set forth in claim 1 wherein the cross sectional area of the exterior channel member is about ten times larger, plus or minus 10 percent, than the cross sectional area of the interior channel member.

3. The conveying apparatus as set forth in claim 1 and further including end plates secured to the ends of the exterior channel members with cut out areas to allow for the passage of portions of container bodies through the interior channel member.

4. The conveying apparatus as set forth in claim 1 and further including guides in the form of rods suspended from the neck tracks on opposite sides of the slot along the length of the slot to preclude the lateral movement of container bodies being conveyed.

5. The conveying apparatus as set forth in claim 1 and further including a gate track formed along a portion of the length of one of the neck tracks and means to move the gate track between a first position wherein the gate track functions as an extension of the neck track in the guiding and conveying of container bodies and a second position wherein the gate track is disposed remote from the neck track for allowing the conveyed container bodies to fall from the conveying apparatus as when a stoppage of container bodies occurs.

6. The conveying apparatus as set forth in claim 1 wherein the conveying apparatus has an input end for the receipt of container bodies to be conveyed and an output end in operative association with a base cupping assembly whereat the conveyed container bodies may be coupled with base cups.

7. The conveying apparatus as set forth in claim 6 and further including a supplemental input end with supplemental neck tracks, interior channel member, exterior channel member and pneumatic means, all operatively coupled to the first mentioned neck tracks, interior channel member, exterior channel member and pneumatic means at a point between the first mentioned input end and the output end whereby container bodies may be conveyed to the output end from either of the two input ends and further including a cam movable between first and second positions whereby container bodies may be conveyed to the output end from one input end to the preclusion of the other input end.

8. The conveying apparatus as set forth in claim 6 and further including a second conveying apparatus with an input end and with an output end positioned in operative association with the base cupping assembly for pneumatically conveying base cups to the base coupling assembly for being coupled to conveyed container bodies.

9. The conveying apparatus as set forth in claim 8 wherein the second conveying apparatus includes an elongated plenum chamber extending substantially from its input end to its output end and with the upper surface of the plenum chamber being formed with air-directing louvers and constituting the surface over which the base cups are conveyed by a flow of air from the plenum chamber, through the louvers, in contact with the base cups being conveyed.

10. The conveying apparatus as set forth in claim 9 and further including pneumatic means to introduce air under pressure to the plenum chamber.

11. The conveying apparatus as set forth in claim 10 and further including rails supported above the plenum chamber to contact the sides and top of the conveyed base cups to guide the conveyed base cups along their path of movement.

12. A machine for manufacturing bottles by coupling container bodies and base cups comprising:
- a base cupping assembly for receiving conveyed container bodies and conveyed base cups and for coupling the received container bodies and received base cups;
- a first pneumatic conveying apparatus for container bodies with an input end and with an output end positioned in operative association with the base cupping assembly for pneumatically conveying container bodies to the base coupling assembly for being coupled with conveyed base cups; the first pneumatic conveying apparatus having a pair of laterally spaced neck tracks defining an elongated slot therebetween for slidingly supporting a container body by its neck; the first pneumatic conveying apparatus also having an inverted, U-shaped, interior channel member extending upwardly from the neck tracks spanning the slot and extending longitudinally substantially the length of the slot and having a cross sectional area sufficient to receive the portion of a container body above its neck, the interior channel member having a top wall and side walls with air-directing louvers formed in the top wall and side walls; the first pneumatic conveying apparatus also having an inverted, U-shaped, exterior channel member extending upwardly from the neck tracks enclosing the interior channel member and extending longitudinally substantially the length of the slot, the cross sectional area of the exterior channel member being between about five and fifteen times the cross sectional area of the interior channel member; and the first pneumatic conveying apparatus also having pneumatic means to introduce air under pressure to the space between the exterior and interior channel members whereby such space may constitute a plenum chamber and direct a flow of air within the interior chamber in a direction dictated by the angle of the louvers for conveying container bodies supported by their necks on the neck tracks in the direction of the air flow; and
- a second pneumatic conveying apparatus with an input end and with an output end positioned in operative association with the base cupping assembly for pneumatically conveying base cups to the base coupling assembly for being coupled to conveyed container bodies; the second pneumatic conveying apparatus also having an elongated plenum chamber extending substantially from its input end to its output end and with the upper surface of the of the plenum chamber being formed with air-directing louvers and constituting the surface over which the base cups are conveyed by a flow of air from the plenum chamber, through the louvers in contact with the base cups being conveyed; and the second pneumatic conveying apparatus also having pneumatic means to introduce air under pressure to the plenum chamber.

* * * * *